United States Patent [19]
Nogi et al.

[11] Patent Number: 5,595,163
[45] Date of Patent: Jan. 21, 1997

[54] APPARATUS AND METHOD FOR CONTROLLING THE FUEL SUPPLY OF A GAS-FUELED ENGINE

[75] Inventors: Toshiharu Nogi, Novi; Robert I. Bruetsch, Whitmore Lake; George Saikalis, West Bloomfield, all of Mich.

[73] Assignee: Hitachi America, Ltd., Tarrytown, N.Y.

[21] Appl. No.: 467,817

[22] Filed: Jun. 6, 1995

[51] Int. Cl.$^6$ .......................... F02M 51/00; F02M 21/04; G01F 1/68
[52] U.S. Cl. ...................... 123/494; 123/527; 73/204.21; 73/204.27
[58] Field of Search .......................... 123/527, DIG. 12, 123/494; 73/118.1, 118.2, 202.5, 204.21, 204.22, 204.27; 137/9, 101.19

[56] References Cited

U.S. PATENT DOCUMENTS

| | | |
|---|---|---|
| 4,537,172 | 8/1985 | Kanehara et al. ........................ 123/527 |
| 4,838,295 | 6/1989 | Smith et al. ................................. 137/9 |
| 4,995,367 | 2/1991 | Yamauchi et al. ....................... 123/494 |
| 5,150,690 | 9/1992 | Carter et al. .............................. 123/527 |
| 5,203,305 | 4/1993 | Porter et al. .............................. 123/478 |
| 5,237,981 | 8/1993 | Polletta et al. ........................... 123/527 |
| 5,251,602 | 10/1993 | Kurihara et al. ........................ 123/527 |
| 5,353,765 | 10/1994 | Saikalis .................................... 123/438 |
| 5,355,855 | 10/1994 | Saikalis .................................... 123/478 |

OTHER PUBLICATIONS

Winsor, Richard E., *Detroit Diesel Heavy Duty Alternative Fuel Engine Development*.

Smith, David H. and Gettel, Lorne E., *A Compressed Natural Gas Mass Flow Driven Heavy Duty Electronic Engine Management System*, pp. 201–223.

Lueptow et al., *Acoustic Natural Gas Fuel Quality Sensor*, pp. 1–8.

Takada et al., *Development of a Heavy-Duty Turbo-charged and Aftercooled CNG-Fueled Lean-Burn Engine—Conversion of a Naturally-Aspirated Diesel Engine into Otto-Type CNG Engine*, pp. 23–29.

Naganuma et al., *New Gas Mixer for Gas Engines—Optimized Air–Fuel Ratio with Negligible Pressure Loss*, pp. 59–70, SAE Technical Paper Series, 1992.

*Primary Examiner*—Erick R. Solis
*Attorney, Agent, or Firm*—John J. Sideris, Esq.

[57] ABSTRACT

An integrated premixture chamber is disclosed, for mixing gaseous fuel and air for delivery to a combustion chamber of an internal combustion engine. The integrated premixture chamber includes a mass air flow sensor, a throttle valve and position sensor, a fuel shut-off valve, a gas flow sensor and a fuel metering valve having discharge outlets downstream of the mass air flow sensor to provide more accurate metering. The integrated premixture chamber is controlled by an electronic unit separate from the engine's control unit.

22 Claims, 10 Drawing Sheets

Fig. 8a
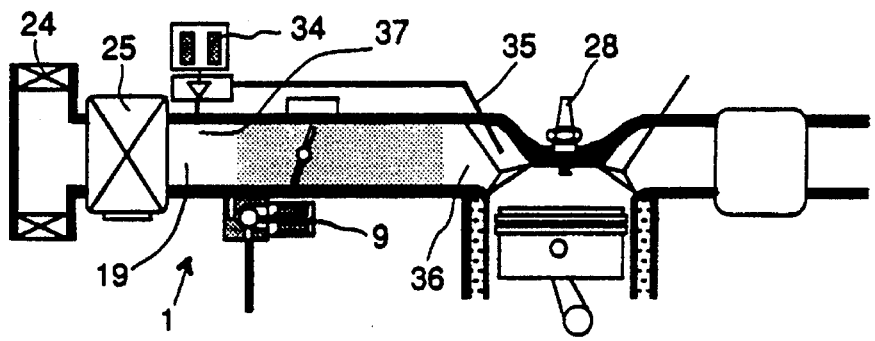
Fig. 8b
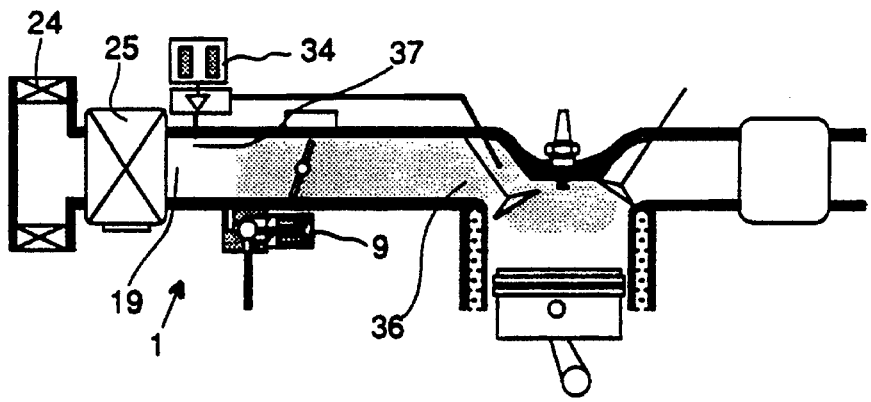
Fig. 9  Engine Torque Fluctuation vs. A/F
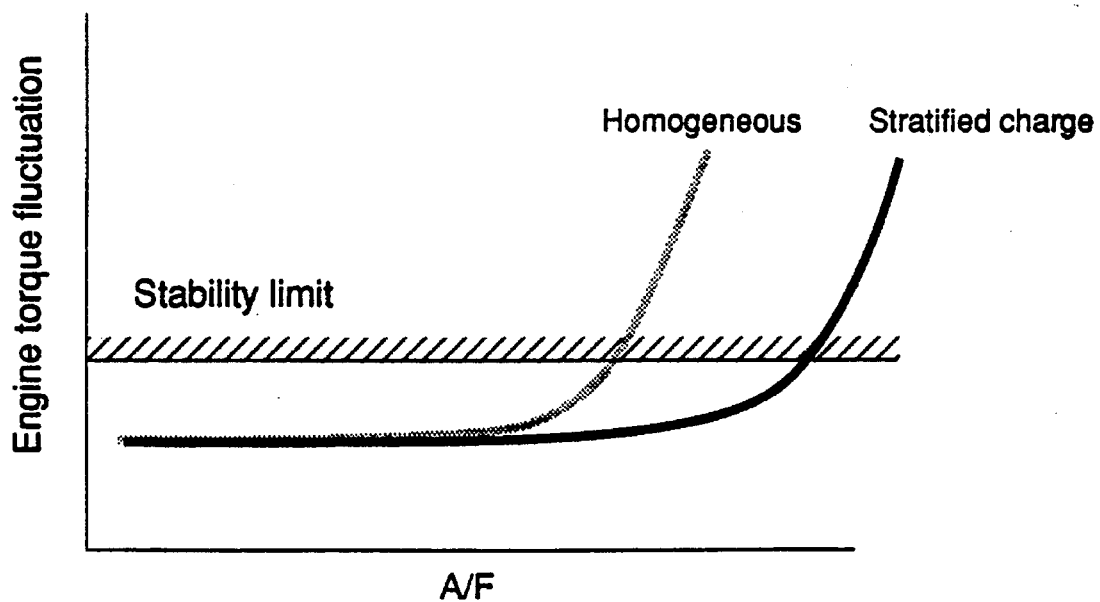

APPARATUS AND METHOD FOR CONTROLLING THE FUEL SUPPLY OF A GAS-FUELED ENGINE

FIELD OF THE INVENTION

The present invention relates in general to internal combustion engines, and more particularly to an apparatus and method for controlling the supply and ignition of compressible gaseous fuels in internal combustion engines.

BACKGROUND OF THE INVENTION

The increase in atmospheric pollution generated by exhaust emissions from conventional gasoline and diesel powered internal combustion engines have caused both federal and state governments to enact laws and establish regulations which impose even greater restrictions on the performance of motor vehicles in the areas of exhaust gas emission and fuel economy. As a result, over the past several years the automotive industry has increased its interest in using alternative fuels to meet the governmental emission requirements and fuel economy standards (CAFE), and to reduce dependence on foreign oil. Alternative fuels being investigated for potential use in automotive vehicles include compressed natural gas (CNG), liquid petroleum gas (LPG) and the like.

Alternative fuels typically have less energy per unit volume than gasoline or diesel fuel. However, they are generally advantageous since gaseous fuels are cleaner burning fuels. Gaseous fuels generate less noxious emissions than gasoline and diesel fuels and are able to better meet the increasingly rigorous governmental regulations.

Great strides have been made in developing control systems and components for gaseous fuel engines to meet the current government requirements. But, despite recent developments and the advantages of gas as a cleaner burning fuel, the exhaust emissions of a gaseous fuel engine still contain an undesirable amount of non-methane hydrocarbons, dust particle components and unburned hydrocarbons (methane). Moreover, the noxious emissions from gaseous fuel engines must be further reduced from current levels to meet future exhaust emission regulations.

In order to minimize the noxious emissions of gaseous fuel engines to meet future requirements, it is necessary to maintain an optimized air/fuel mixture for such engines at or near a selected point, such as the stoichiometric or a lean burn point. However, it has been difficult to accurately control the air/fuel mixture in a gaseous fuel engine because heretofore, the fuel injection systems have not been able to provide sufficiently accurate metering and control.

A typical gaseous fuel injection systems includes a pressurized fuel storage tank, a pressure regulator for reducing the fuel from a relatively high storage pressure to a lower working pressure (about one atmosphere), a fuel metering valve for controlling the gas supply to the engine, an air/gas mixer at the engine air intake and an engine management system for overall control and proper engine operation. Problems occur due to the fact that the injection of gaseous fuel into the intake manifold of the engine, where it is mixed with air, is sensitive to variations in manifold pressure, gas temperature and gas pressure caused by engine operating and environmental conditions. Such variations require extensive control techniques in order to maintain the desired quantity of injected fuel over the wide range of engine operating conditions. In addition, the fuel flow rate, which is much higher than in a conventional gasoline engine, requires a metering valve to control the flow rate over a large range, reducing its accuracy. Finally, the mixing of gaseous fuel and air produces problems simply due to the inherent difficulty of gas to gas mixing.

For accurate fuel metering, a combination of a digital and analog valve has been proposed. However, this type of valve is inherently complicated and difficult to control, and expensive to produce. Moreover, movement within the digital valve (or the duty cycle injector connected thereto) affects gas flow sensing accuracy. Installing a fuel valve at each cylinder injector aids in accurate fuel metering since the fuel flow rate is decreased due to the fact that several valves (one at each cylinder injector) are used instead of the one valve at the throttle. However, because the injector and intake valve are close together, there isn't sufficient time to mix the air and fuel thoroughly.

Accordingly, what is needed is an improved gaseous fuel injection system that will reduce noxious exhaust emissions and increase fuel consumption by accurately controlling the supply and ignition of the air/fuel mixture.

It is, therefore, a principal object of the present invention to provide a gaseous fuel injection system in which the air/fuel mixture can be accurately controlled to provide for increased fuel economy and reduced exhaust emission through a leaner burn operation.

It is another object of the present invention to provide a gaseous fuel injection system in which the air/fuel mixture can be accurately controlled to provide for maximum torque during various operating conditions of the engine.

It is a further object of the present invention to provide a gaseous fuel engine having increased fuel economy through a lighter weight, compact design fuel injection system.

It is still another object of the present invention to accomplish the above-stated objects by utilizing an apparatus which is simple in design and use, and economical to manufacture.

The foregoing objects and advantages of the invention are illustrative of those which can be achieved by the present invention and are not intended to be exhaustive or limiting of the possible advantages which can be realized. Thus, these and other objects and advantages of the invention will be apparent from the description herein or can be learned from practicing the invention, both as embodied herein or as modified in view of any variations which may be apparent to those skilled in the art. Accordingly, the present invention resides in the novel methods, arrangements, combinations and improvements herein shown and described.

SUMMARY OF THE INVENTION

In accordance with these and other objects of the invention, a brief summary of the present invention is presented. Some simplifications and omissions may be made in the following summary, which is intended to highlight and introduce some aspects of the present invention, but not to limit its scope. Detailed descriptions of a preferred exemplary embodiment adequate to allow those of ordinary skill in the art to make and use the inventive concepts will follow in later sections.

According to a broad aspect of the invention, an apparatus and method for operating an internal combustion engine having an alternative fuel supply source is disclosed. An integrated premixture chamber is provided for mixing gaseous fuel and air for delivery to a combustion chamber of an internal combustion engine through an air intake passageway such as an intake manifold. The integrated premixture chamber includes an air flow sensor disposed in the air intake passageway for detecting the amount of air moving through the air intake passageway; a gas flow sensor for detecting the amount of gaseous fuel supplied to the combustion chamber; a gas valve responsive to the gas flow sensor and having at least one outlet disposed in the air intake passageway downstream of the air flow sensor, for selectively controlling the amount of gaseous fuel supplied to the combustion chamber; a throttle valve, having a pivotally secured plate disposed in the air intake passageway downstream of the outlet of the gas valve, for regulating the quantity of fluid flow through the air intake passageway; a throttle position sensor responsive to varying positions in the throttle plate, for actuating the gas valve to provide gaseous fuel in response to the throttle plate position; and a processor for controlling the operation of the gas valve, the processor being responsive to at least the air flow sensor, the gas flow sensor and the throttle position sensor.

BRIEF DESCRIPTION OF THE DRAWINGS

FIGS. 8a–8b are perspective diagrams of another embodiment of the present invention mounted in an internal combustion engine.

FIG. 9 is a graphical form diagram representative of the results achieved in accordance with the present invention.

DETAILED DESCRIPTION OF THE PREFERRED EMBODIMENTS OF THE INVENTION

The present invention contemplates an improved gaseous fuel engine having an integrated premixture chamber in which the air/fuel mixture is accurately controlled to provide for a more leaner burn of the fuel to reduce noxious exhaust emissions and decrease fuel consumption.

It is to be understood that the present invention may be used with equal facility and advantage with various gaseous fuels such as CNG, LPG, propane or the like, and that the following description of a CNG fuel engine, related to but not forming part of the invention, is provided for illustrative purposes only.

Figure 1:
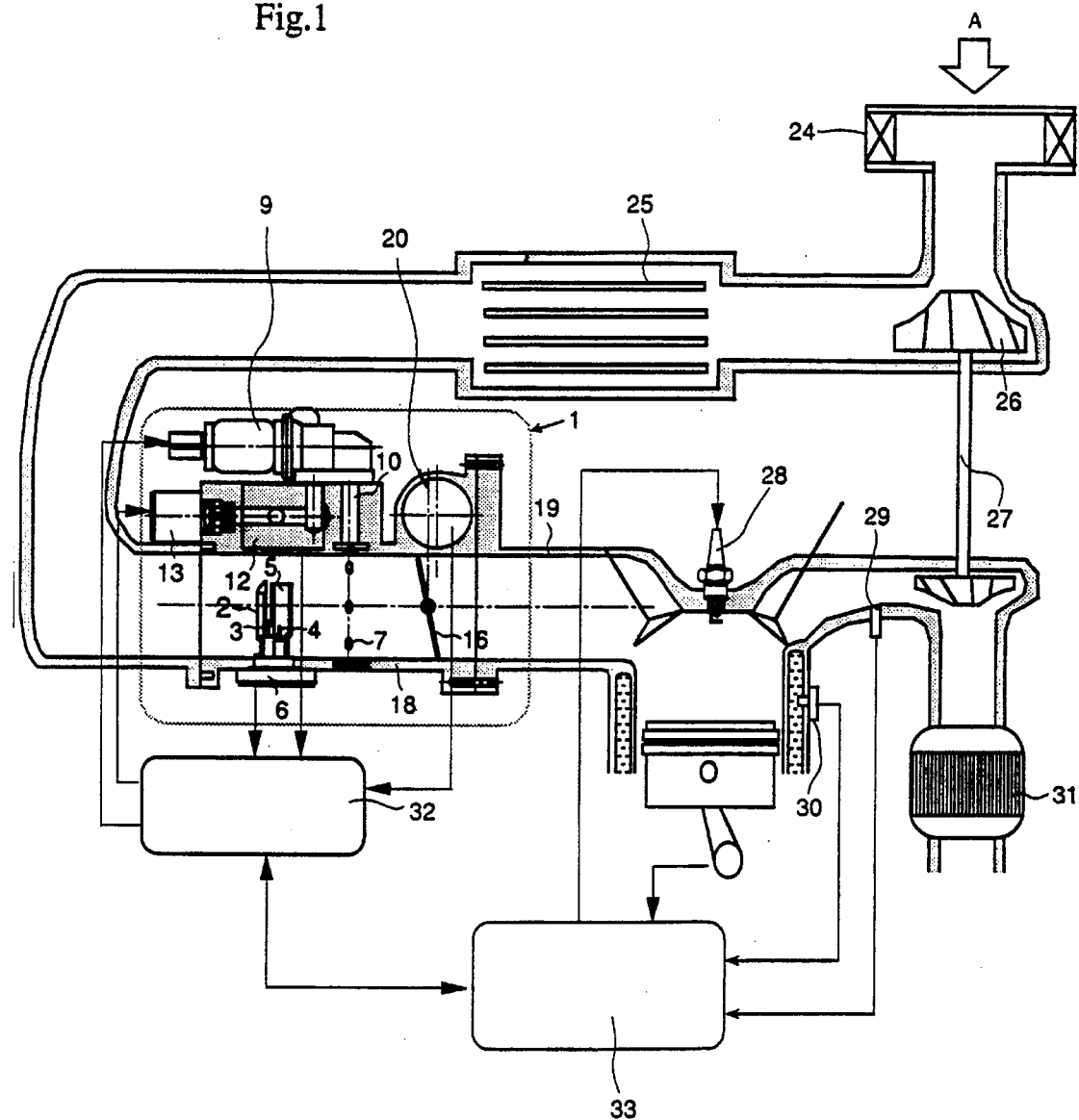
FIG. 1 is a perspective diagram illustrating a preferred embodiment of the present invention mounted in an internal combustion engine.

Referring now to the drawings, wherein like numerals refer to like elements, there is disclosed in FIG. 1 broad aspects of a preferred embodiment of the invention. In FIG. 1, a CNG engine fuel control system having an integrated premixture chamber identified generally by reference numeral 1 in accordance with the present invention is shown. The CNG fuel engine is only shown partially because the internal details of the engine, except for its integrated premixture chamber 1 and related controls, does not form part of the invention. However, a portion of the CNG fuel engine is depicted for ease in understanding how the present invention may be practiced in conjunction with any known types of internal combustion engines. It also should be noted that the integrated premixture chamber 1 is not limited to use in reciprocating engines of the type depicted but may be also employed with rotary type engines. Additionally, the invention is described in conjunction with only a single cylinder of a multi-cylinder engine, as it is believed that those skilled in the art can readily understand how the invention is practiced in conjunction with multiple cylinder engines and engines of varying configurations.

The integrated premixture chamber 1 is installed in the intake passage of the CNG fuel engine. Air is introduced in series through an air cleaner 24, passed the turbines 26 of a turbocharger 27, through an intercooler 25, and into the integrated premixture chamber 1. At the integrated premixture chamber 1, CNG fuel is introduced through at least one and preferably a plurality of aperture outlets or orifices 7 for controlled mixing with the air. The gas/air mixture is driven passed the pivotal plate of a throttle valve 16 that provides selective flow to the engine's combustion chamber in predetermined quantities in response to the movement of the vehicle accelerator pedal, transmitted electronically or through suitable linkage to the throttle valve 16. In the case of an electronically linked accelerator, the operation of throttle valve 16 is controlled by a sub-control unit 32. Regardless of the type of accelerator linkage, information with respect to the position of the throttle valve 16 is input to the sub-control unit 32 via a throttle position sensing unit 20 of the type common in the industry. Although depicted in block form in FIG. 1, the sub-control unit 32 is preferably mounted on the integrated premixture chamber 1, in close proximity to the various sensors and components described herein.

As described in detail below, the sub-control unit 32 also oversees the operation of a gas shut off valve 13 and a gas metering valve 9. The sub-control unit 32, in turn, communicates with a main-control unit 33, regarding the control and operation of the integrated premixture chamber 1. The main-control unit 33 further provides engine feedback and control through the ignition of spark plug 28 mounted in the cylinder head, and through the continuous monitoring of a lambda ($O_2$) exhaust sensor 29 mounted in the exhaust passage of the engine for detecting the amount of oxygen in the exhaust, a coolant temperature sensor 30 mounted on the side of the cylinder block, and a crank angle sensor (not shown for clarity), all using conventional sensor devices and methods understood by those skilled in the art.

The integrated premixture chamber 1 is in the fluid communication with the engine's combustion chamber such that the gas/air mixture passes an intake valve when opened into the combustion chamber for ignition. Exhaust gases are discharged out of the exhaust side of the combustion chamber through an exhaust valve into an exhaust passage that communicates with the turbocharger 27, and finally through a catalytic converter 31. The catalytic converter 31 includes a catalyst bed for oxidizing carbon monoxide (CO) and hydrocarbons (HC) while deoxidizing nitrous oxide (NOx), as is commonly practiced. The exhaust gases thus treated are then discharged into the atmosphere through an exhaust pipe and suitable exhaust and muffler system (not shown).

Figure 2:
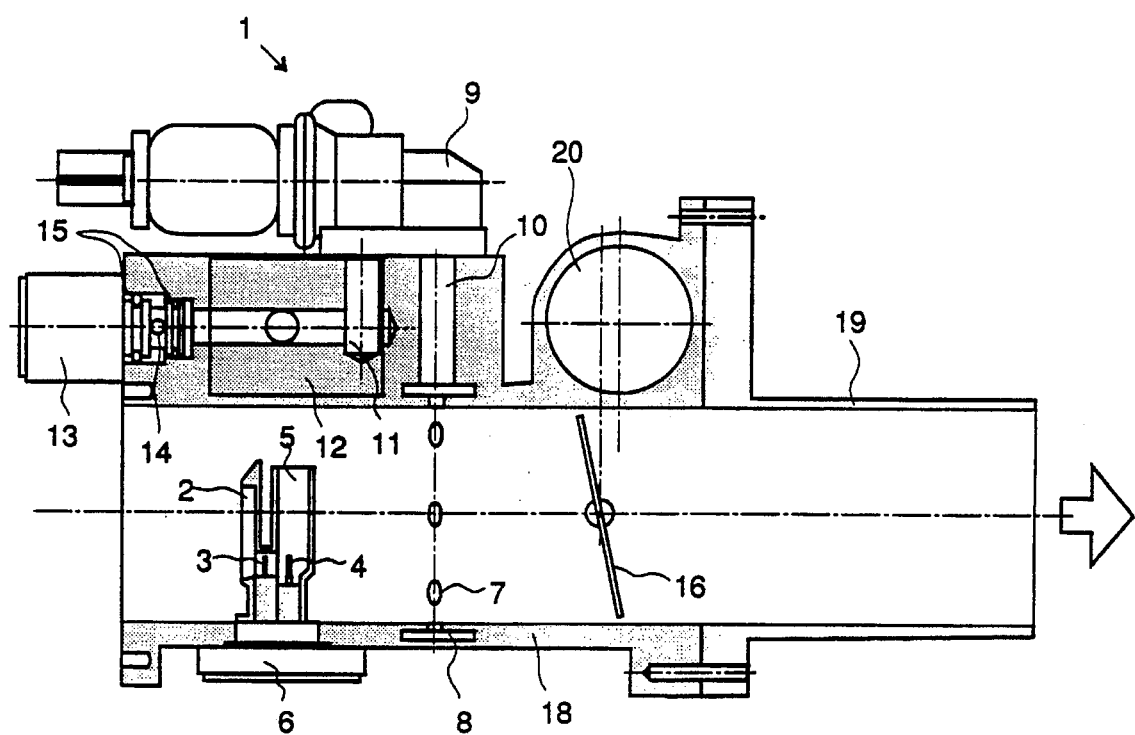
FIG. 2 is a perspective diagram of a cross-sectional view of a preferred embodiment of the present invention.

The components of the integrated premixture chamber 1 shown in FIG. 1 are best understood by referring to the chamber's 1 operative arrangement illustrated in detail in FIG. 2. As illustrated in FIG. 2, a preferred embodiment of the integrated premixture chamber 1 includes an axial lumen 19 having a generally circular opening therethrough and defined by intake manifold walls 18. The integrated premixture chamber 1 also includes a mass air flow sensor 6 located at the upstream (with respect to the flow of air, designated generally by the arrow A) end thereof. The mass air flow sensor 6 has connecting passageways 2 and 5, in which a hot wire 3 and a cold wire 4 are respectively located. The hot wire 3 and cold wire 4 may be physically the same, made from a suitable metal or alloy of metals, coated by glass. As is conventionally practiced in the art, the cold wire 4 is used to measure the intake air temperature. Conversely, the hot wire 3 is used in a thermal process to measure the air flow. The electrical power dissipated by the hot wire 3 resistance (i.e., the current), to maintain a constant temperature as the air flows passed, is proportional to the air mass flow rate. Accordingly, variations in the current in hot wire 3 are used to measure the mass air flow.

In the case when an optional turbo charger 27 is used with the CNG engine, variations of the intake air temperature are greatly increased, and the temperature of intake manifold wall is increased as well. Advantageously, in a preferred embodiment of the invention, the passageways 2 and 5 of the mass air flow sensor 6 are separated from the intake manifold wall 18, so that the effect of air temperature variations on the accuracy of the mass air flow sensor 6 is minimized. The measured variations of the mass air flow sensor 6 are monitored by the sub-control unit 32.

Gaseous fuel is supplied to the integrated premixture chamber 1 from fuel supply tanks having a pressure regulator (not shown) via a preferably metal conduit into a shut-off valve 13 secured to the integrated premixture chamber 1, The shut-off valve 13 is a low pressure valve having a ball 14 mounted in a fuel passageway 15 that normally seats in a valve seat (not shown for clarity) to block the fuel flow through the passageway 15. The shut-off valve 13, which can be switched between open or closed positions, is controlled by the sub-control unit 32 to selectively permit the flow of fuel, such as when the vehicle's ignition is engaged.

Figure 3A:
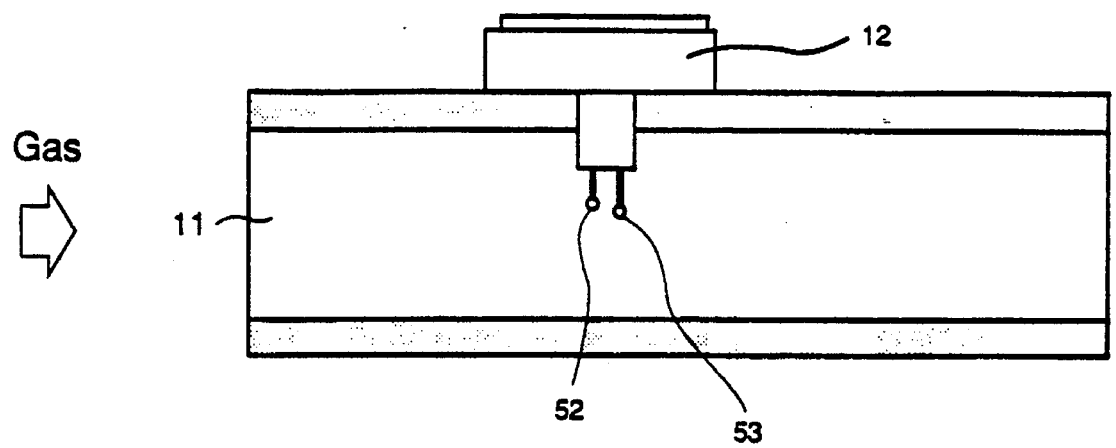
FIGS. 3a–3f are perspective diagrams of cross-sectional views of several embodiments gas flow sensor according to the present invention.

The shut-off valve 13 communicates with a gas flow sensor 12, also secured to the integrated premixture chamber 1, for monitoring the flow of gaseous fuel. Turning briefly to FIG. 3, there is disclosed in detail several embodiments of the gas flow sensor 12. As illustrated in FIG. 3a, the gas flow sensor 12 may be constructed in the well known manner of providing a hot wire 52 and a cold wire 53. As practiced in the art, the current variation due to the power dissipated in keeping the hot wire 52 temperature constant is measured as a function of the mass flow of the gaseous fuel. This information is communicated to the sub-control unit 32.

Figure 3B:
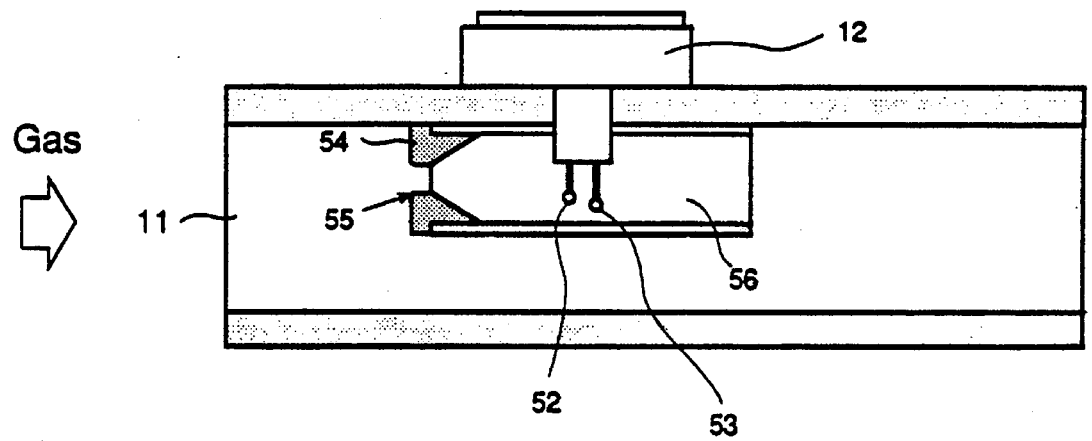

FIG. 3b illustrates another embodiment of the gas flow sensor 12, in which the hot wire 52 and the cold wire 53 are located in a longitudinal lumen 56 defined by a housing indicated generally by the numeral 55. Gas flowing through the lumen 56 is restricted by the opening of a nozzle 54, so that the upper limit of the range of detection of the gas flow sensor 12 is not exceeded. By restricting the gas flow such that the upper limit of the sensor's 12 detection range is not reached, a greater accuracy of the flow measurement is achieved. As can be understood, the cross-sectional area of the lumen 56 will vary in accordance with the cross-section area of the main gas flow conduit 11, and the measurement range of the sensor 12 itself.

Figure 3C:
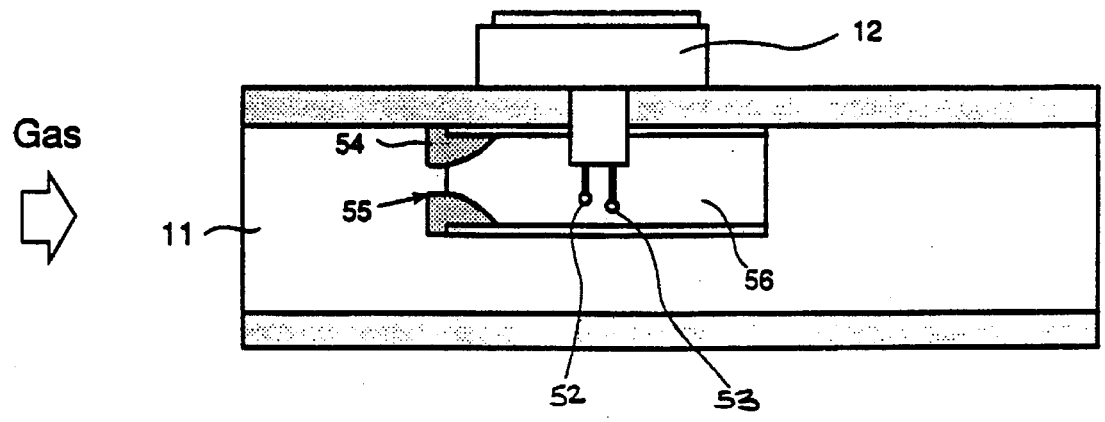

FIG. 3c discloses yet another embodiment of the gas flow sensor 12. This embodimemt is similar to the embodiment illustrated in FIG. 3b, and includes a nozzle 54 having a gradually expanding inner surface to reduce the turbulence of the gas in the lumen 56 and thereby provide for more accurate and consistent measurements.

Figure 3D:
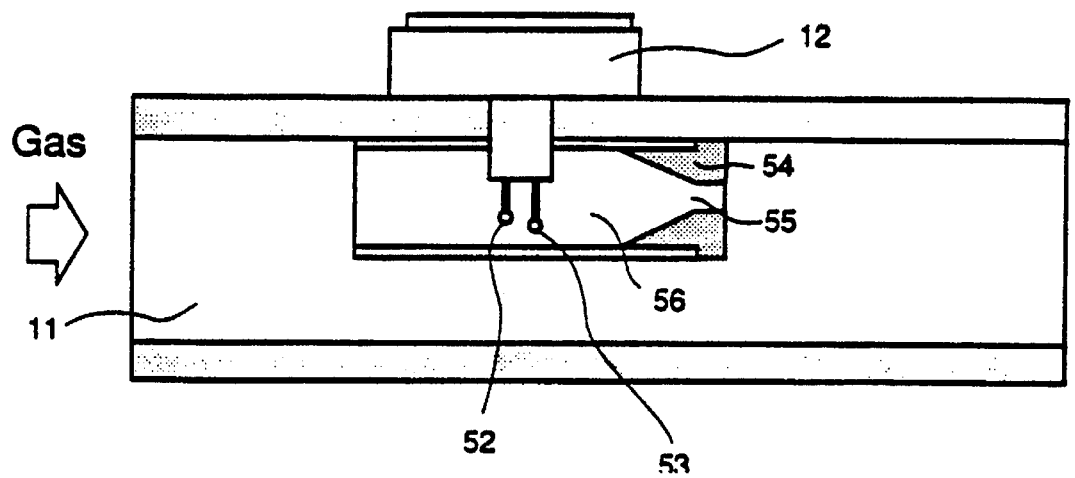
Figure 3E:
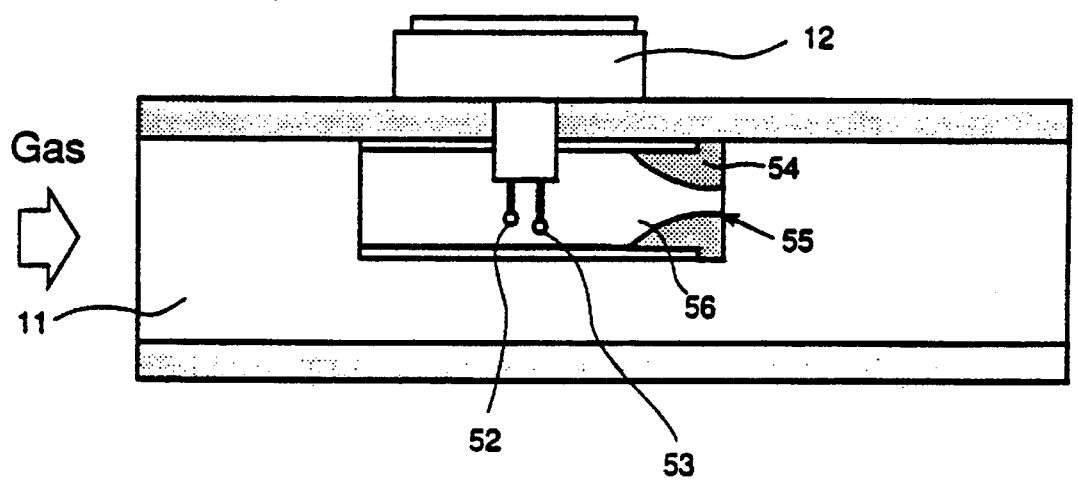
Figure 3F:
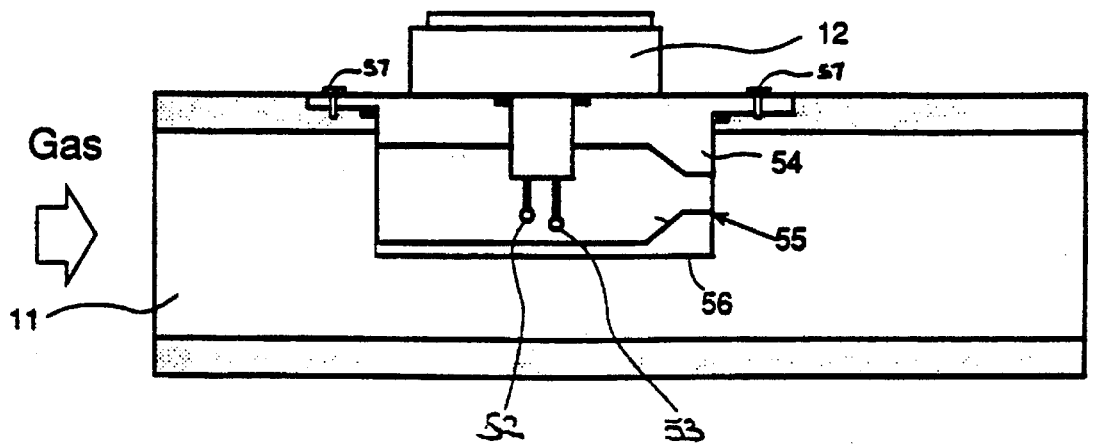

FIGS. 3d–3f disclose additional embodiments of the gas flow sensor 12 that provide further reductions in the turbulence of gas in the lumen 56. FIGS. 3d–3f illustrate embodiments of gas flow sensor 12 similar to the embodiments illustrated in FIGS. 3b and 3c, having, however, a nozzle 54 on the downstream side of housing 55 rather than the upstream side. By providing the nozzle 54 downstream of hot wire 52 and cold wire 53, gas flowing through the lumen 56 undergoes compression rather than expansion about the wires 52, 53. As can be appreciated by those skilled in the art, expansion of the gas causes turbulence whereas compression provides for more stability and therefore a more accurate measurement of the gas flow. Accordingly, the embodiments illustrated in FIGS. 3d–3f provide for an improved accuracy in gas flow sensor 12, by having the nozzle 54 restriction downstream of the hot and cold wires 52, 53.

FIG. 3e discloses an embodiment of the gas flow sensor 12 having a nozzle in the downstream position, wherein the inner surfaces of the nozzle 54 are gradually decreased to further reduce gas turbulence.

FIG. 3f provides an embodiment of gas flow sensor 12 secured to conduit 11 by bolts 57 having therebelow O-rings (not shown for clarity), to provide for increased reliability and ease of replacement when necessary.

Due to the similarity of the embodiments illustrated in FIGS. 3c–3f with that illustrated in FIG. 3b, further description of these embodiments is not believed to be necessary to understand the construction and operation of the gas flow sensor 12. Additionally, it should be understood that the gas flow sensor 12 of the present invention is not limited to the above-disclosed embodiments, and that any suitable fluid flow sensor or transducer may be employed which provides an output signal indicative of the fuel flow in the fuel delivery conduit 11.

Turning back to FIG. 2, the gas flow conduit of gas flow sensor 12 is in fluid communication with a gas metering valve 9. The gas metering valve 9 continuously varies the flow of gaseous fuel under the control of the sub-control unit 32, in accordance with engine speed, exhaust oxygen levels, the flow rate feedback provided by the gas flow sensor 12, and throttle position data provided by the throttle sensing unit 20. The metering valve 9 varies the fluid flow of the gaseous fuel to a passageway 10 using suitable means common to those skilled in the art. Passageway 10 communicates with the lumen 19 of the integrated premixture chamber 1 through at least one orifice 7, and preferably a plurality of orifices 7.

As illustrated in the preferred embodiment of the invention, the integrated premixture chamber 1 includes three orifices 7 located downstream of the mass air flow sensor 6. Here, CNG fuel, for example, is homogeneously mixed with the intake air. Because of the downstream location of orifices 7, the CNG fuel does not measurably affect the accuracy of the mass air flow sensor 6.

The integrated premixture chamber 1 further includes the throttle valve 16 positioned downstream of the orifices 7, and which is controlled remotely by linkage or electronically in response to accelerator pedal movement. The supply of intermixed gas and air to the engine's combustion chamber is regulated by the throttle valve 16, as is well known in the industry. The throttle position sensor 20, mounted on the integrated premixture chamber 1, as shown in FIGS. 1 and 2, provides throttle plate position information to the sub-control unit 32 to assist in the overall operation of the engine.

Figure 4A:
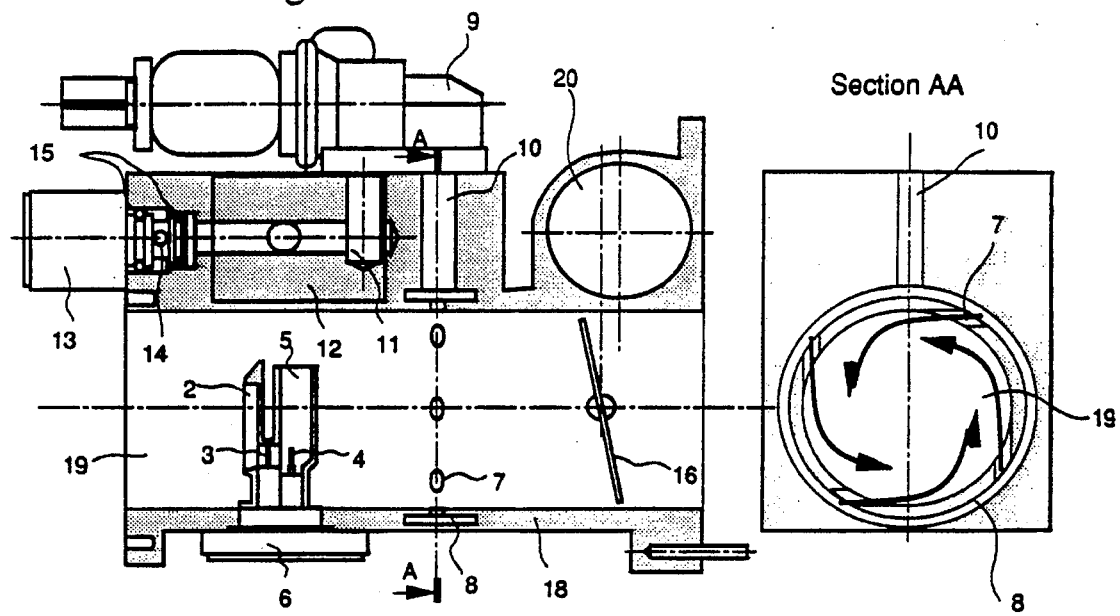
FIGS. 4a–4b are perspective diagrams of cross-sectional views of preferred embodiments of the present invention.

In FIG. 4a, the integrated premixture chamber 1 is shown alongside a cross-sectional view of the chamber 1 taken along the line AA. In the preferred embodiment disclosed, the orifices 7 contain a generally elliptical opening due to their somewhat tangential configuration with respect to the chamber's lumen 19. The orifices 7 are connected to passageway 10 by a generally circular passageway 8 that circumscribes the lumen 19 and provides fluid communication therebetween. As depicted by the darkened arrows shown in the cross-sectional view in FIG. 4a, this arrangement causes the gaseous fuel discharged from the orifices 7 to swirl about the lumen 19 during mixture with the air. The swirling flow during the gas-air intermix provides a positive turbulence that results in a more homogenous gas/air mixture and, as is well known, a more efficient combustion.

Figure 4B:
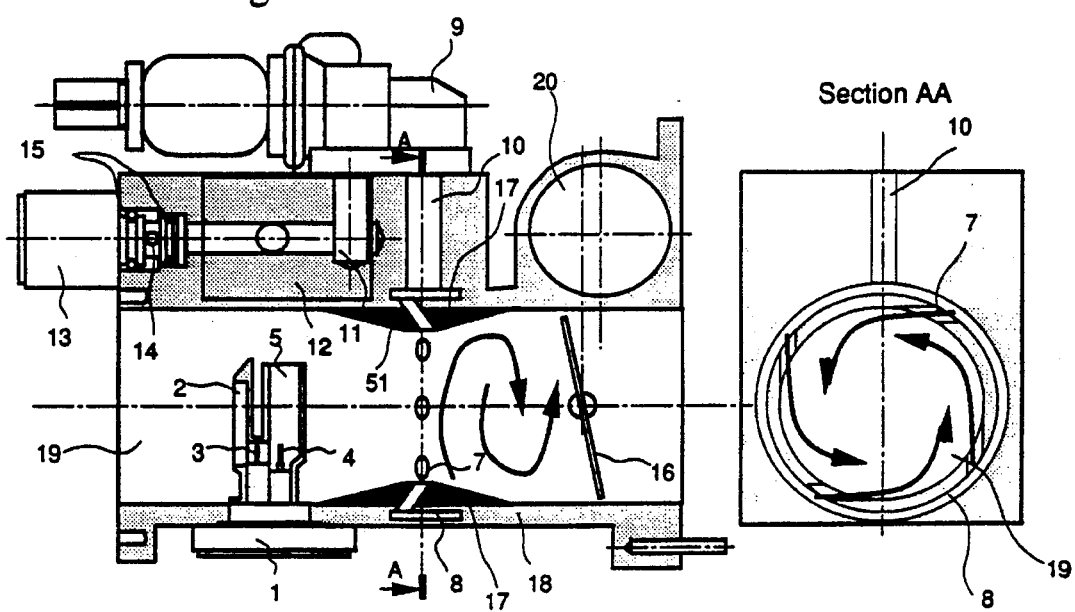

FIG. 4b discloses another embodiment of the present invention, in which the lumen 19 contains a diametrically restricted area 17 adjacent to the orifices 7. Due to the larger area downstream of the restriction 17, a venturi effect is created during the swirling mixture, as the gas and air are allowed to expand downstream of the restriction 17. The expansion of the gases causes further positive turbulence that aids in the homogenizing of the gas and air.

Figure 5:
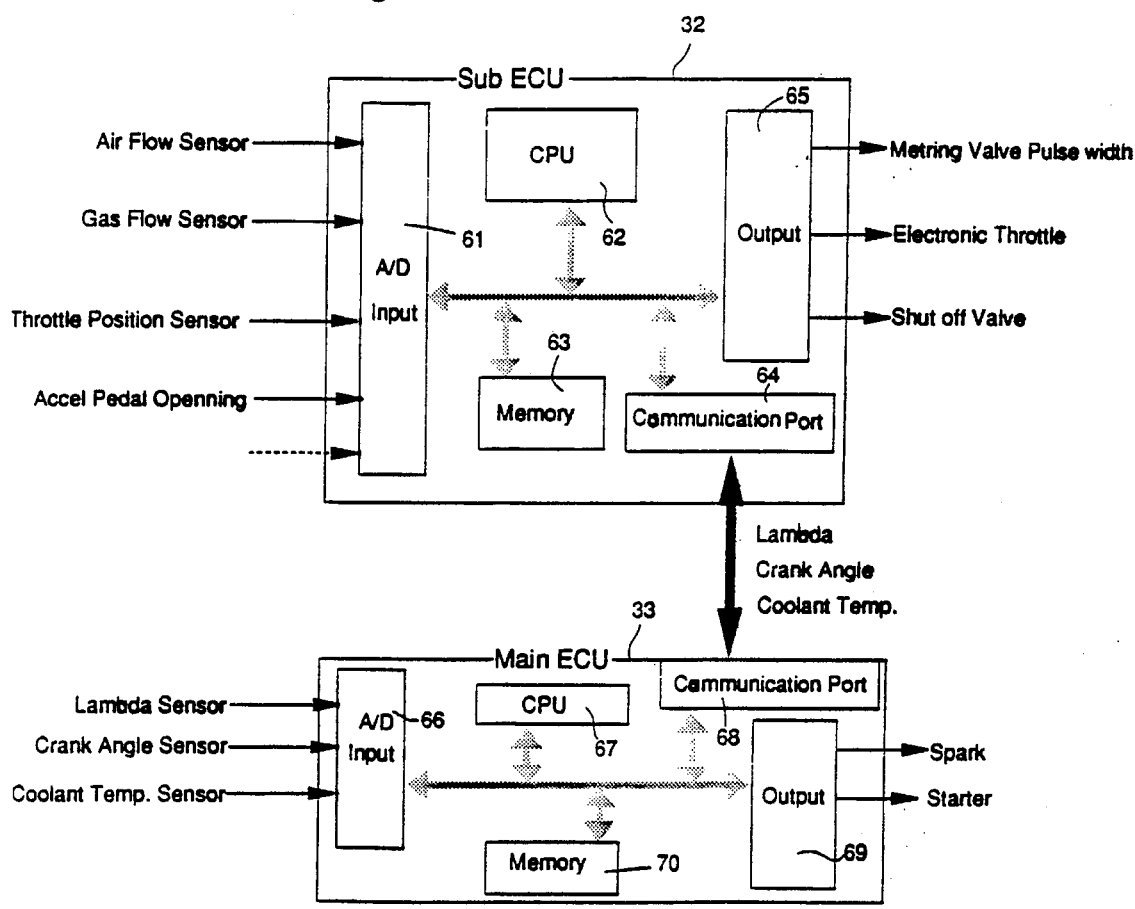
FIG. 5 is a block form diagram of the control systems, according to the present invention.

Turning now to FIG. 5, the elements of a preferred embodiment of the sub-control-unit 32 are diagramatically shown in block form. The sub-control unit 32 receives input signals from the mass air flow sensor 6, the gas flow sensor 12 and the throttle sensing unit 20. Optionally, electronic feedback of other sensors, for example, an accelerator pedal opening sensor, may also be provided to the sub-control unit 32.

The sub-control unit 32 includes an analog-to-digital converter 61 for receiving the above-described analog sensor signals and converting them into digital representations, as is well known in the art. These digital signals are communicated via a common bus to a central processing unit ("CPU") 62 for executing predetermined data processing, and to a memory 63 preferably consisting of read-only memory (ROM) for storing necessary data constants and programs to be executed by the CPU 62, and a random access memory (RAM) for storing data to be processed by the CPU 62 and to process results obtained during execution of the programs.

The results of the CPU's 62 processing are communicated via the common bus to output circuitry 65 for controlling, for example, the metering valve 9, the shutoff valve 13 and the throttle valve 16 (in the case of electronic control). The processing results are also communicated via the common bus to a communication port 64 for interfacing with the main control unit 33.

The main control unit 33, like the sub-control unit 32, includes an analog-to-digital converter 66, a CPU 67, memory 70, a communication port 68 and an output circuit 69. The functions of these components are similar to the functions performed by the identically designated components of the sub-control unit 32, and therefore do not require additional discussion. Noticeably, the main-controller 33 receives input signals from, inter alia, the lambda ($O_2$) sensor 29, the coolant temperature sensor 30, and the crank angle sensor. These signals are processed by the main-controller 33 and may be communicated to the sub-control unit 32 during overall engine operation. As can be appreciated, various other ambient or engine conditions may be supplied to the sub-control unit 32, the main-control unit 33, or any combination of both for overall general operation of the engine, without departing from the scope of the invention.

In addition, the sub-control unit 32 and main-control unit 33 contemplated by the present invention may be implemented programmatically or by direct electrical connection through customized integrated circuits, or a combination of both, using any of the methods known in the industry for providing the functions described above without departing from the teachings of the invention. Those skilled in the art will appreciate that from the disclosure of the invention provided herein, commercial semiconductor integrated circuit technology would suggest numerous alternatives for actual implementation of the functions of the sub-control unit 32 and main-control unit 33 that would still be within the scope of the invention.

Figure 6:
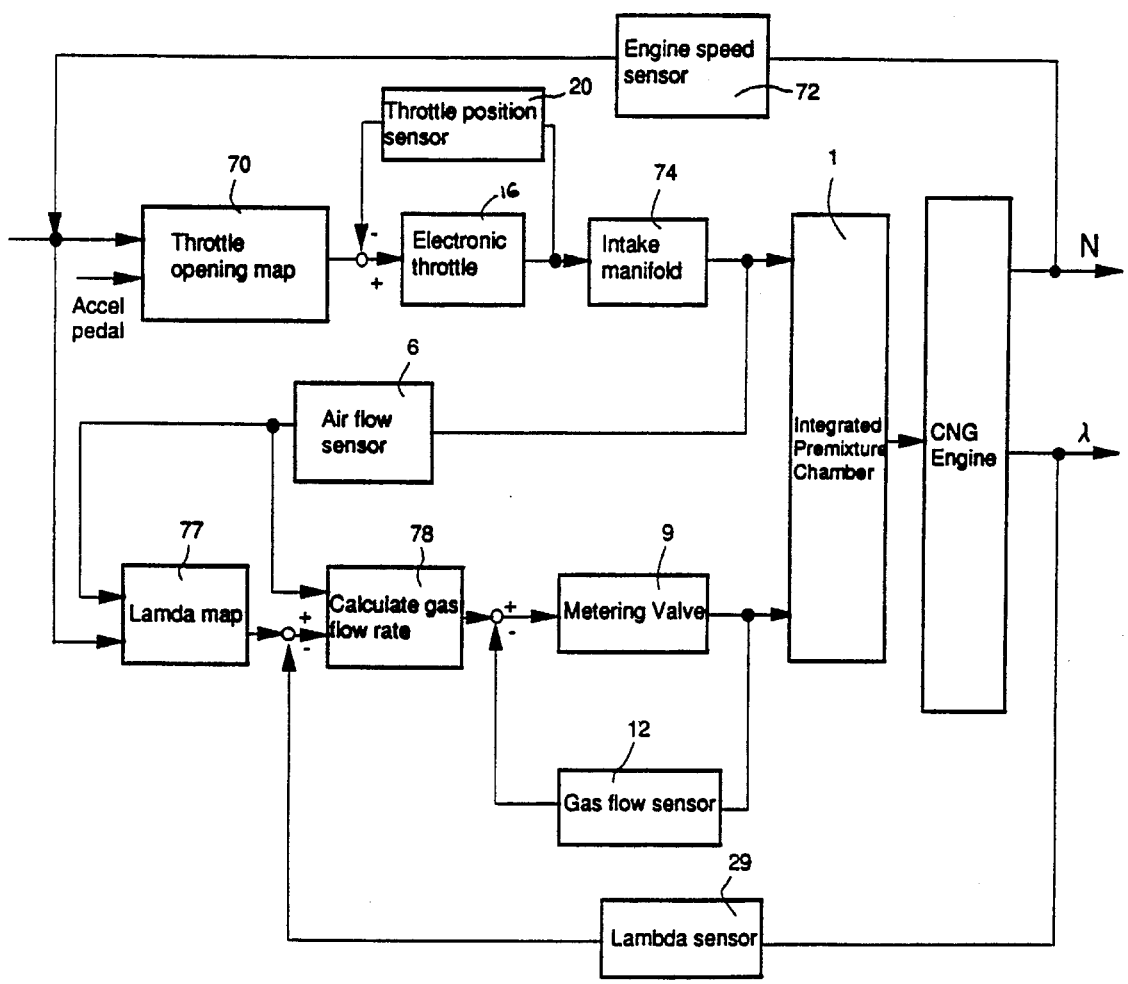
FIG. 6 is a block form diagram of the operative arrangement of the components of the present invention.

Turning now to FIG. 6, the operative control of a preferred embodiment of the invention is shown in block diagram form. Beginning at the top, data from an engine speed sensor 72, such as a tachometer, and data representative of the accelerator pedal opening are combined to calculate the engine torque demand and create a corresponding throttle opening map 70. From the throttle opening map 70, a throttle opening target is communicated to the throttle valve 16 to meet the torque demand of the engine. The opening of the throttle valve 16 is based on the opening map 70 and feedback of the throttle plate position from the throttle sensing unit 20. As a result of the throttle valve opening, air is introduced through the intake manifold 74 to the integrated premixture chamber 1 to be combined with the gaseous fuel for delivery to the CNG engine.

For the delivery of fuel, air flow data is provided by mass air flow sensor 6 along with engine speed data (from the engine speed sensor 72) to create a lambda map 77, as is currently practiced in the art. Lambda is a ratio of fuel-air measurements used to determine the fuel needs of the engine. Lambda map target values are calculated according to the following formula:

$$\text{lambda} = \text{air-fuel ratio/stoichiometric air-fuel ratio}$$

The lambda target established by the lambda map 77 is combined with air flow data and feedback oxygen levels from the lambda ($O_2$) sensor 29 to calculate a gas flow rate 78 for metering valve 9. Data from the gas flow sensor 12 is used to maintain the predetermined gas flow rate to the metering valve 9. From the metering valve 9, gas is delivered to the integrated premixture chamber 1 to create the gas/air mixture for engine combustion.

Figure 7:
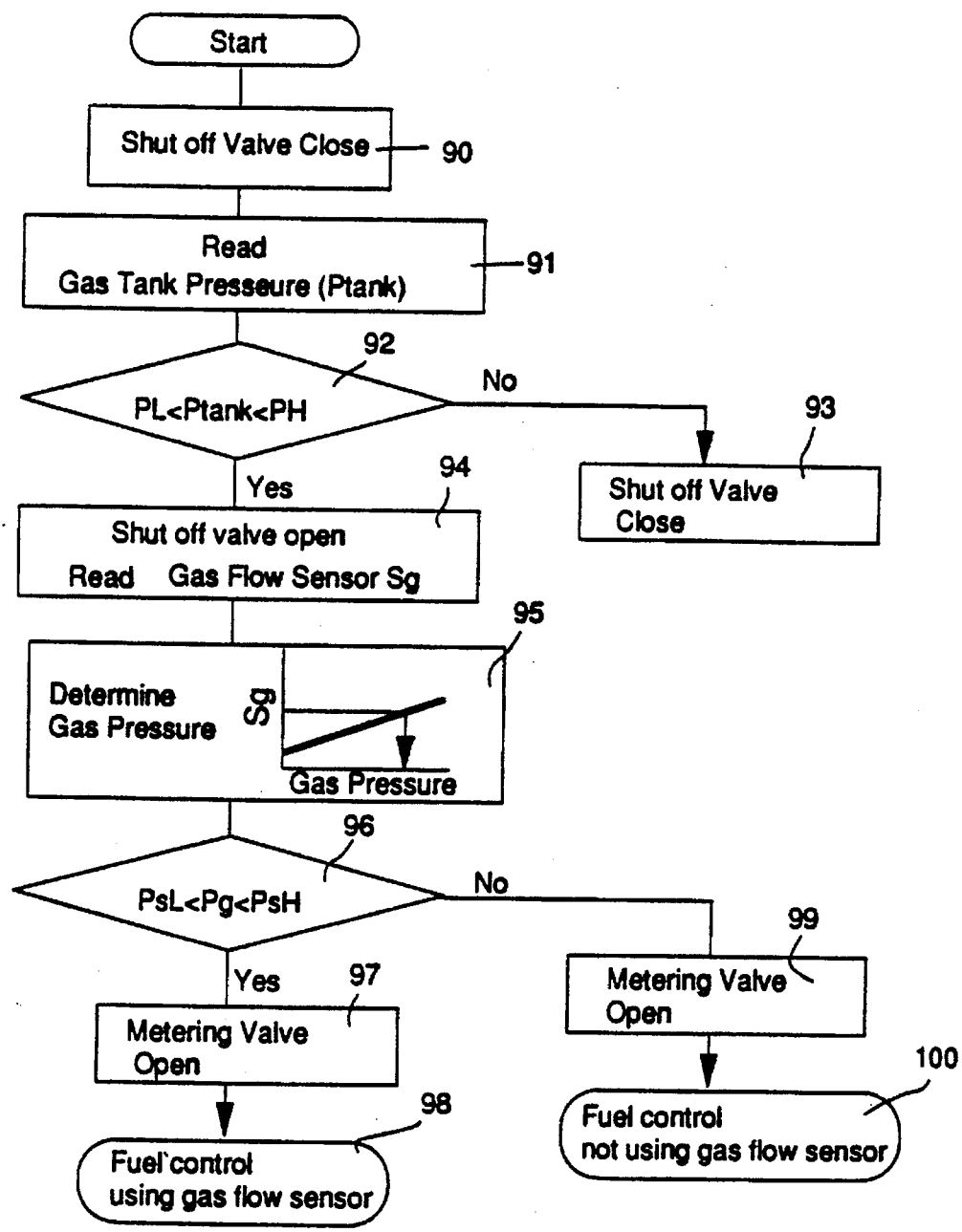
FIG. 7 is a flow diagram of the operation of a gas flow sensor, according to the present invention.

FIG. 7 illustrates the process control for gas flow sensor 12. Initially, the shutoff valve 13 is maintained in a closed position, blocking fuel flow from fuel source tanks (step 90). The gas tank pressure (P tank) is read, and if the pressure is within a predetermined high-low range, $P_L$–$P_H$, the shut-off valve 13 is opened (steps 91–92, 94). Of course, if the tank pressure is not within an acceptable, predetermined range, the shutoff valve 13 remains closed (step 93).

After the shut-off valve 13 is opened, the gas flow sensor 12 generates a gas flow signal Sg, which is a function of the pressure of the gas passing through the gas flow sensor 12 (steps 94–95). This signal is dependant upon the gas pressure during low or no flow conditions. At this point, the gas metering valve 9 reamains closed. If the gas pressure Pg is within an acceptable, predetermined high-low range, $P_{SL}$–$P_{SH}$, then the gas metering valve 9 is opened, and a fuel control start operation using the gas flow sensor signal for feedback proceeds (steps 96–98). If the gas pressure Pg is not within the $P_{SL}$–$P_{SH}$ range, the fuel control start proceeds without the gas flow sensor signal as feedback. Instead, the fuel flow rate employs, for example, the air flow rate and feedback from the lambda ($O_2$) sensor 29 to control the gas flow (steps 99–100).

Figure 10A:
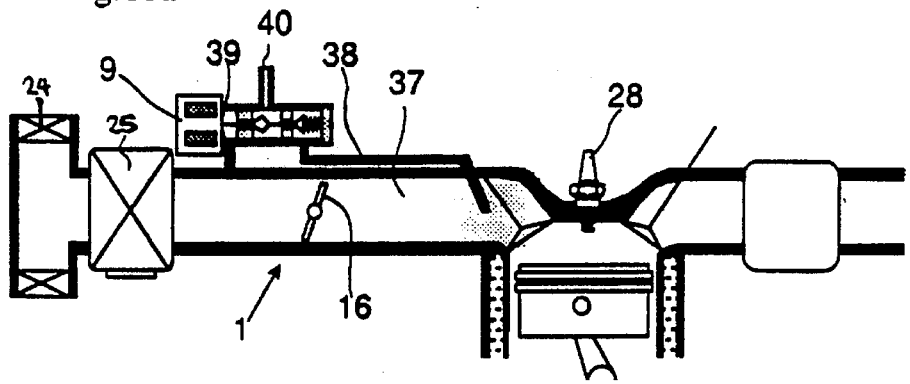
FIGS. 10a–10b are perspective diagrams of yet another embodiment of the present invention mounted in an internal combustion engine.

FIGS. 8 and 10 illustrate additional embodiments of the present invention, which are generally the same as the above described embodiments and, for that reason, components of these embodiments which are the same as previously described embodiments have been identified by the same reference numerals and will not be described again, except insofar as it is necessary to understand the construction and operation of these embodiments.

In FIG. 8, a preferred embodiment of the integrated premixture chamber 1 is shown having an air bypass valve 34 to provide for a leaner burner mixture when desired. In conventional internal combustion engines, fuel and air are homogeneously mixed before delivery to the engine. A known method to expand the lean burn limit of the fuel/air mixture is to provide a richer mixture near the spark plug 28 gap itself. The present invention provides for the expansion of the lean burn limit of the gas/air mixture by employing the air bypass valve 34 having an intake port in communication with the lumen 19 upstream from gas/air mixing (designated generally by the numeral 37), and an output port 35 having a distal end located in close proximity to the intake valve.

During a lean burn operation, the air bypass valve 34 is opened and air is delivered to the area about the intake valve, designated generally by the reference numeral 36. When the intake valve is closed, the air accumulates near the intake valve. When the intake valve is then opened, air enters first, and then the gas/air mixture, resulting in a stratified mix having a richer mixture near the spark plug 28 and a leaner mixture in the lower part of the cylinder. Hence, as is well known, the lean burn limit is expanded.

FIG. 9 graphically depicts the results of the stratified charge created by the embodiment disclosed in FIG. 8. As can be seen, the lean burn limit due to the instability of engine torque fluctuation is expanded when the mixture is less homogenous and more stratified.

Referring now to FIG. 10, another embodiment of the present invention is shown. In this embodiment, an integrated premixture chamber 1 is shown having a 3-way gas metering valve 9 for achieving a stratified charge. In this embodiment, the gas metering valve is a 3-way valve 9 having an intake conduit 40, typically made of metal, and in communication with the gas flow sensor 12 (not shown in this figure). The 3-way metering valve 9 also includes a first discharge conduit 39 for discharging gas into the area upstream of the throttle valve 16 for mixing with air, and a second discharge conduit 38 for discharging gas downstream of the throttle valve 16 into the area near the intake valve.

Figure 10B:
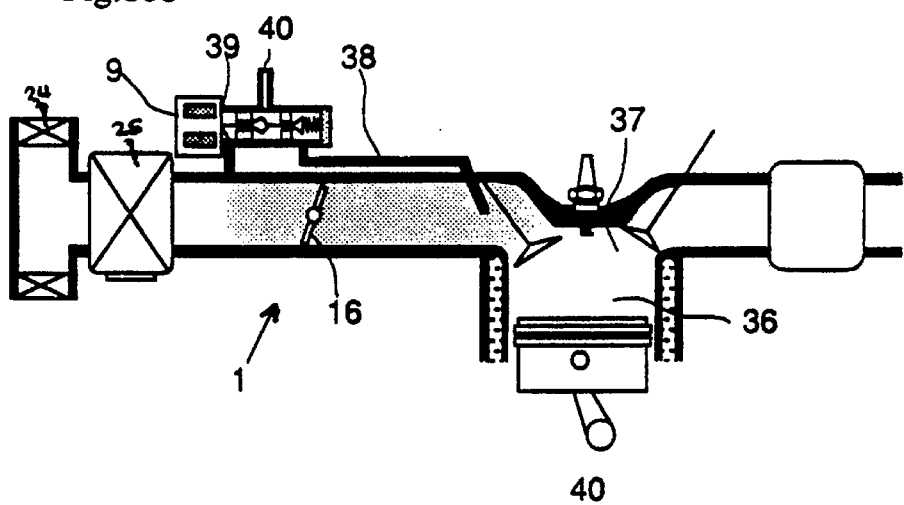

In a situation in which the fuel flow into the integrated premixture chamber 1 is low, as when the load on the CNG engine is low, it is desirable to expand the lean burn limit by the creation of a stratified charge. According to the present invention, gas may be discharged from the distal end of discharge conduit 38 after gas is discharged through conduit 39 where it is mixed with the air. In this manner, because of the non-homogeneous nature of the gas and air in the integrated premixture chamber 1, a stratified charge is achieved in the combustion chamber with a richer mixture following a leaner mixture into the chamber. Alternatively, under normal engine load when the fuel flow rate is high, gas may be supplied simultaneously through both conduits 38 and 39, resulting in a more homogeneous mixture (as shown in FIG. 10b).

Figure 11:
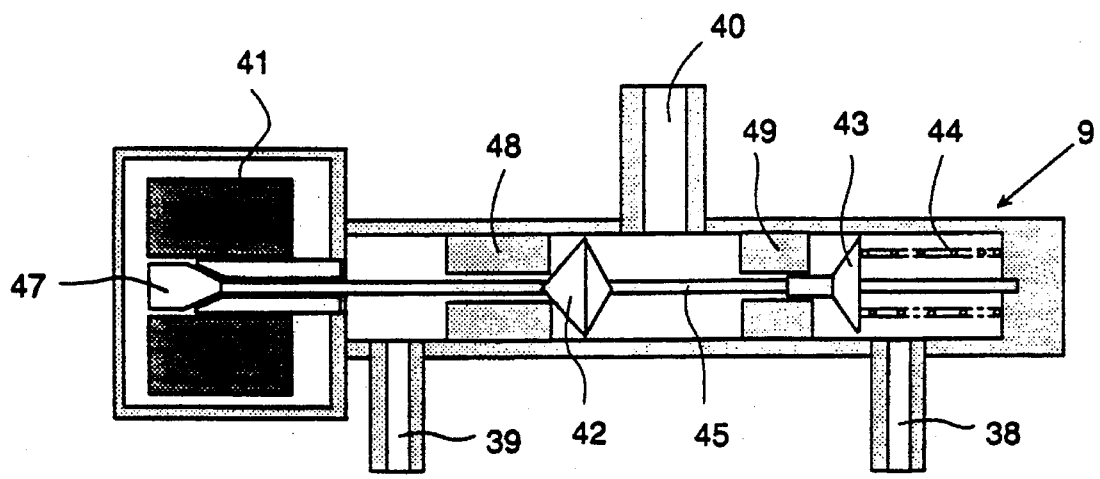
FIG. 11 is a perspective diagram of another embodiment of a gas metering valve according to the present invention.

FIG. 11 illustrates in detail the 3-way metering valve 9 of a preferred embodiment on the invention. As described above, the 3-way metering valve 9 includes intake conduit 40, and first and second discharge conduits 39 and 38. The 3-way metering valve 9 further includes a solenoid coil 41 surrounding an actuator 47, a longitudinal arm 45 connecting the actuator 47 to a first valve 42 and a second valve 43. The valves 42 and 43 are biased in a closed position against valve seats 48, 49 respectively by a spring 44.

When the coil 41 is energized, the actuator 47 causes arm 45 to move the right as viewed in FIG. 11. This causes valve 42 to open first, opening the communication between conduit 40 and conduit 39, and allowing the gas to discharge into the upstream portion of the integrated premixture chamber 1. If further energy is supplied to the coil 41, arm 45 is further displaced, causing valve 43 to fully separate from contact with the valve seat 49, thereby permitting fluid flow between conduit 40 and conduit 39. Thus, as can be understood, more gas is delivered to the integrated premixture chamber 1 to extend the lean burn limit as needed.

From the foregoing descriptions of the various features of the preferred embodiments of the present invention, it can be appreciated that a compact, integrated premixture chamber for accurately controlling the mixture of gaseous fuel and air can be provided for more efficient and responsive engine control and fuel combustion under different operating conditions, thereby achieving high fuel efficiency and a reduction in noxious exhaust emission.

Although the present invention has been described in detail with particular reference to preferred embodiments thereof, it should be understood that the invention is capable of other and different embodiments, and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only, and do not in any way limit the invention, which is defined only by the claims.

What is claimed:

1. A premixture apparatus for operating a gaseous fuel internal combustion engine having a fuel supply means and an air intake means, said apparatus comprising:

air flow sensing means disposed in said air intake means for detecting the mass flow rate of air delivered through said air intake means;

gas flow sensing means for detecting the mass flow rate of gaseous fuel to be supplied to said internal combustion engine, wherein said gas flow sensing means is located in a longitudinal housing having a lumen defined by said housing, said housing further comprising a nozzle on one end thereof constricting said lumen;

gas valve means responsive to said gas flow sensing means and having at least one outlet disposed in said air intake means downstream of said air flow sensing means, for selectively controlling the mass flow rate of gaseous fuel supplied to said internal combustion engine;

throttle means, having a movable plate disposed in said air intake means downstream of the outlet of said gas valve means, for varying the quantity of air and fuel flow through said air intake means; and control means for controlling the operation of said gas valve, said control means being responsive to at least said air flow sensing means and said gas flow sensing means.

2. A premixture apparatus according to claim 1 further comprising a switching valve means coupled to said gas flow sensing means and having a first open position and a second closed position, whereby said switching valve means can be switched to the open position to permit the flow of fuel to said gas flow sensing means or switched to the closed position to block the flow of fuel to said gas flow sensing means.

3. A premixture according to claim 1 further comprising a throttle position sensing means responsive to varying positions in said throttle plate, for actuating said gas valve means to provide gaseous fuel in response to said throttle plate position; wherein said control means is responsive to at least said air flow sensing means, said gas flow sensing means and said throttle position sensing means.

4. A premixture apparatus according to claim 1 wherein said air intake means has a longitudinal axis and interior walls with curved outlets to effect gaseous fuel discharged from the outlet of said gas valve means to flow in a circuitously swirling fashion within said air intake means with respect to the longitudinal axis of said air intake means.

5. A premixture apparatus according to claim 1 wherein said air intake means further comprises an area of reduced cross-section disposed in close proximity to the outlet of said gas valve means to effect an increased velocity and turbulence on gases passing through said area of reduced cross-section.

6. A premixture apparatus according to claim 1 wherein said gas valve means comprises an intake port, a first valve outlet and a second valve outlet.

7. A premixture apparatus according to claim 1 further comprising an air bypass valve means having an air intake port and an air outlet, whereby said air intake port is in communication with said air intake means upstream of the outlet of said gas valve means, and said air outlet is in communication with said air intake means downstream of said throttle valve means.

8. A premixture apparatus comprising a gas bypass valve means according to claim 6, whereby said first gas outlet is in communication with said air intake means upstream of said throttle valve means, and said second gas outlet is in communication with said air intake means downstream of said throttle valve means.

9. A premixture apparatus according to claim 1 further comprising a plurality of outlets downstream of said gas valve means for disposing gaseous fuel in said air intake means.

10. A premixture apparatus according to claim 9, wherein said gas valve means is configured such that said second valve outlet is in communication with said intake port only after said first valve outlet is in communication with said first valve outlet.

11. A premixture apparatus according to claim 1 further comprising a main engine control unit coupled to said control means for communicating sensor related data therebetween during operation of the internal combustion engine.

12. A method of operating an internal combustion engine having a gaseous fuel supply source and an air intake passageway coupled to at least one combustion chamber, said method comprising the steps of:

detecting within the air intake passageway the mass flow rate of air delivered through the air intake passageway;

detecting the mass flow rate of gaseous fuel to be supplied to the combustion chamber by measuring the mass flow rate of gaseous fuel passing through a gas flow sensor disposed in a longitudinal housing having a constricted nozzle located on one end of said housing;

selectively supplying an amount of gaseous fuel in accordance with operating characteristics of the engine, to the air intake passageway for intermixing with the air at a location downstream from where the air flow rate is being detected; and regulating a throttle disposed in the air intake passageway downstream of the location where the gaseous fuel and air mix, for varying the quantity of air and fuel flow through the air intake passageway to the combustion chamber in accordance with operating characteristics of the engine.

13. A method according to claim 12 further comprising the step of providing a region of reduced cross-sectional area located where gaseous fuel is supplied within the air intake passageway to effect an increased velocity and turbulence on the air and fuel passing within the region of reduced cross-sectional area in the air intake passageway.

14. A method according to claim 12 further comprising the step of stratifying the mixture of fuel and air by providing an air bypass means having an air intake port and an air outlet, whereby the air intake port is in communication with the air intake passageway upstream of the location where the gaseous fuel is supplied to the air intake passageway, and the air outlet is in communication with the air intake passageway downstream of the throttle for supplying air downstream of the throttle.

15. A method according to claim 12 further comprising the step of stratifying the mixture of gaseous fuel and air by providing a gas bypass valve having a gas intake port and two gas outlets, whereby the first gas outlet is in communication with the air intake passageway upstream of the throttle, and the second gas outlet is in communication with the air intake passageway downstream of the throttle for supplying gas downstream of the throttle.

16. An integrated premixture apparatus for mixing gaseous fuel and air for delivery to a combustion chamber of an internal combustion engine coupled to a fuel supply system and to a main engine control unit, and having an air intake passageway coupled to at least one combustion chamber, said premixture apparatus comprising:

an air flow sensor disposed in said air intake passageway for detecting the mass flow rate of air moving through said air intake passageway;

a gas flow sensor for detecting the mass flow rate of gaseous fuel supplied to said combustion chamber;

a gas valve responsive to said gas flow sensor and having at least one outlet disposed in said air intake passageway downstream of said air flow sensor, for selectively controlling the amount of gaseous fuel supplied to said combustion chamber;

a throttle valve, having a pivotally secured plate disposed in said air intake passageway downstream of the outlet of said gas valve, for regulating the quantity of air and fuel flow through said air intake passageway;

a throttle position sensor responsive to varying positions in said throttle plate, for actuating said gas valve to provide gaseous fuel in response to said throttle plate position; and a sub-central processor unit located in close proximity to said premixture chamber for controlling the operation of said gas valve, said processor being responsive to at least said air flow sensor, said gas flow sensor and said throttle position sensor, wherein said sub-central processor unit communicates engine sensor data to and from said main engine control unit.

17. A premixture apparatus according to claim 16 further including a valve coupled to said gas flow sensor and having a first open position and a second closed position, whereby said valve can be switched to the open position to permit the flow of gaseous fuel to said gas flow sensor or switched to the closed position to block the flow of gaseous fuel to said gas flow sensor.

18. A premixture apparatus according to claim 16 wherein said air intake passageway has a longitudinal axis and interior walls with curved outlets to effect gaseous fuel discharged from the outlet of said gas valve to flow in a circuitously swirling fashion within said air intake passageway with respect to the longitudinal axis of said air intake passageway.

19. A premixture apparatus according to claim 16 wherein said air intake passageway further comprises an area of reduced cross-section disposed in close proximity to the outlet of said gas valve to effect an increased velocity and turbulence on gases passing through said area of reduced cross-section.

20. A premixture apparatus according to claim 16 wherein said gas valve comprises an intake port, a first valve outlet and a second valve outlet, whereby said gas valve means is configured such that said second valve outlet communicates with said intake port only after said first valve outlet is in communication with said intake port.

21. A premixture apparatus according to claim 16 further comprising an air bypass valve having an air intake port and an air outlet, whereby said air intake port is in communication with said air intake passageway upstream of the outlet of said gas valve, and said air outlet is in communication with said air intake passageway downstream of said throttle valve.

22. A premixture apparatus according to claim 16 further comprising a gas bypass valve having an gas intake port and two gas outlets, whereby said first gas valve outlet is in communication with said air intake passageway upstream of said throttle valve, and said second gas outlet is in communication with said air intake passageway downstream of said throttle valve.

* * * * *